(12) United States Patent
Kato

(10) Patent No.: US 6,893,023 B2
(45) Date of Patent: May 17, 2005

(54) METAL GASKET WITH PARTIAL COATING

(75) Inventor: Yutaka Kato, Utsunomiya (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 10/267,741

(22) Filed: Oct. 10, 2002

(65) Prior Publication Data
US 2003/0075875 A1 Apr. 24, 2003

(30) Foreign Application Priority Data
Oct. 23, 2001 (JP) .......................................... 2001-325050

(51) Int. Cl.$^7$ ............................................. F02F 11/00
(52) U.S. Cl. ...................................... 277/592; 277/594
(58) Field of Search ................................ 277/592, 594, 277/596

(56) References Cited

U.S. PATENT DOCUMENTS

| | | | | |
|---|---|---|---|---|
| 4,397,472 A | * | 8/1983 | Czernik | 277/592 |
| 4,799,695 A | | 1/1989 | Yoshino | |
| 5,150,910 A | * | 9/1992 | Udagawa | 277/592 |
| 5,197,747 A | * | 3/1993 | Ueta et al. | 277/595 |
| 5,280,928 A | * | 1/1994 | Ueta et al. | 277/595 |
| 5,393,076 A | | 2/1995 | Hagiwara et al. | |
| 5,472,217 A | * | 12/1995 | Hagiwara et al. | 277/596 |
| 5,582,415 A | * | 12/1996 | Yoshida et al. | 277/592 |
| 5,695,203 A | * | 12/1997 | Udagawa | 277/595 |
| 5,769,430 A | * | 6/1998 | Udagawa | 277/592 |
| 6,180,167 B1 | * | 1/2001 | Majewski et al. | 427/198 |
| 6,343,795 B1 | * | 2/2002 | Zerfass et al. | 277/593 |
| 6,349,945 B1 | * | 2/2002 | Schmucker et al. | 277/592 |
| 6,517,085 B2 | * | 2/2003 | Udagawa et al. | 277/592 |
| 6,550,782 B2 | * | 4/2003 | Okazaki et al. | 277/592 |
| 6,585,272 B2 | * | 7/2003 | Inamura et al. | 277/592 |
| 6,619,665 B2 | * | 9/2003 | Miyaoh et al. | 277/592 |

FOREIGN PATENT DOCUMENTS

EP    0 853 204    7/1998

OTHER PUBLICATIONS

Patent Abstracts of Japan, Publication No. 09068281, Published on Mar. 11, 1997, Applicant: Nippon Reinz Co., Ltd.
Patent Abstracts of Japan, publication No. 10205620, Published on Aug. 4, 1998, Applicant: Nippon Reinz Co., Ltd.

* cited by examiner

Primary Examiner—Alison K. Pickard
(74) Attorney, Agent, or Firm—Manabu Kanesaka

(57) ABSTRACT

A metal gasket is formed of a metal base plate for sealing between two members. The metal gasket has a bead around a cylinder bore and a bead around a fluid hole. The coatings are applied on both surfaces of the beads, respectively. When the metal gasket is tightened, strong sealing surface pressures are locally generated at sealing line portions. The thicknesses of the coatings at the sealing line portions are formed to be thinner than those of the other portions.

1 Claim, 4 Drawing Sheets

METAL GASKET WITH PARTIAL COATING

BACKGROUND OF THE INVENTION AND RELATED ART STATEMENT

The invention relates to a metal gasket installed between two members, such as a cylinder head and a cylinder block, of an internal combustion engine to seal therebetween. More specifically, the invention relates to a metal gasket formed of a single metal base plate or a plurality of metal base plates coated with a coating.

When joint surfaces between the cylinder head and the cylinder block (cylinder body) of the engine of the automobile are sealed, the cylinder head gasket is installed therebetween to seal combustion gas, cooling water and the like.

In view of the demand for a light weight and low cost of the engine, a structure of the cylinder head gasket has been shifted to a simple type formed of a single or two metal base plates from a laminated type having a number of metal plates. Due to a few constituent plates, only limited types of materials can be used.

In the laminated type metal plate gasket, a sealing member, such as a bead, grommet and shim, can be combined if necessary and provided in double for effective sealing. However, in the single or two plate gasket, a type and a number of sealing members are limited, so that a simplified sealing device has to be used. Moreover, the area available for the sealing device is limited with reduction of an engine size.

As shown in FIG. 5, the cylinder head gasket is formed to have a shape of an engine member such as a cylinder block. The cylinder head gasket includes holes 2 for cylinder bores (hereinafter referred to simply as "cylinder bore 2"); fluid holes 3, 4 for circulating cooling water and engine oil (hereinafter referred to simply as "fluid holes 3, 4"); and bolt holes 5 for tightening bolts and the like. Also, the sealing devices, such as beads 12, 13, with respect to the respective holes 2, 3 to be sealed, are provided.

In one gasket for sealing between the engine members, different sealing properties are required to seal the different holes. At the cylinder bore 2, it is required to seal the combustion gas with a high temperature and a high pressure, while a fluid with a relatively low temperature and a low pressure is required to be sealed at the fluid hole 3.

An arc shape bead 12 with a narrow width, which is formed of a material with elasticity to fit the uneven surface, is provided around the cylinder bore 2. Also, the cylinder bore 2 is surrounded by the bolt holes 5. Bolts are inserted into the bolt holes 5 to tighten the cylinder head and the cylinder block by applying a large pressure.

On the other hand, the bead 13 is provided around the fluid hole 3 to seal the same. Depending on a structure of the engine, the fluid hole 3 may be formed outside the area surrounded by the bolt holes 5. In this case, pressing forces by the tightening bolts are applied on only one side of the fluid hole 3, so that the tightening forces become small. To solve the problem, a higher bead, a narrower bead, or a pointed bead has been used.

Further, to improve the fitting property of the metal surface abutting against the bead and the gasket, a coating has been used.

For example, in the gasket disclosed in Japanese Utility Model Publication (JITSUKAIHEI) No. 2-16861, a bead in a belt shape is partially provided and, at the same time, a coated elastic film is disposed on both surfaces of the metal base plate. In this case, the thickness of the coated elastic film provided on the bead projection side is made thicker than that on the other side, so that a strong tightening pressure applied to the top portion of the bead is absorbed by the thick coated elastic film to thereby keep the same tightening surface pressure as that on the other side. Thus, a good surface pressure balance can be maintained, and a high torque holding ability and durability can be obtained.

However, in the gasket, since a large sealing surface pressure is applied to the top portion of the bead, when the gasket is used for a long time, the coated elastic film covering the bead top portion is pushed to cause the flow or wearing-out. Thus, the sealing surface pressure is substantially reduced to cause the torque down.

Also, in a gasket disclosed in Japanese Utility Model Registration No. 2605613, a rubber-like elastic material is coated on both surfaces of a supply member formed of a metal plate and provided with a bead. In the gasket, a rubber hardness of the coating applied on the bead projection side is made higher than that on the other side to suppress the flow of the coating at the top portion of the bead. To make the rubber hardness on the other side lower, a surface pressure per unit area is held at a low value to thereby balance the sealing properties on both surfaces.

However, in the gasket, even if the sealing surface pressure is lowered, by the coating of the lower rubber hardness applied on the other side, as a whole, the sealing surface pressure on the bead top portion becomes partially extremely higher than that of the peripheries of the bead by the coating having the high rubber hardness applied on the bead projection side. Thus, there has been a problem wherein the surface pressure applied to the coating on the bead top portion becomes high, and the flow and torque-down, which results in a substantial lowering of the surface pressure, can not be prevented.

A gasket disclosed in Japanese Patent Publication (TOKUKAIHEI) No. 10-103523, includes the first coating layer provided on the bead projection side of a metal plate except for the bead top portion, and the second coating layer provided on the other side of the metal plate. The first coating layer is prevented from flowing at the bead top portion to thereby suppress the torque-down, which is a reduction of the sealing surface pressure at the bead portion with the passage of time.

However, since the coating layer is not applied on the bead top portion, in case the small unevenness, such as a tool mark, is present on the surface of the engine member abutting against the bead top portion, the unevenness can not be absorbed. Therefore, there has been a risk that the combustion gas, cooling water, oil and the like may slightly leak.

In view of the above problems, the present invention has been made. An object of the invention is to provide a metal gasket, wherein in case joint surfaces between the cylinder head and the cylinder block of the engine are sealed by a metal gasket formed of a single or a plurality of metal plates, the surface pressure distribution around the bead can be properly held, and good sealing property and durability capable of suppressing the flow of the coating at the bead top portion and the torque-down brought by the flow, can be obtained.

Further objects and advantages of the invention will be apparent from the following description of the invention.

SUMMARY OF THE INVENTION

A metal gasket of the present invention for attaining the above objects is structured as follows:

1) In the metal gasket formed of a single metal base plate, wherein a bead is provided around a hole to be sealed of the metal base plate and coatings are applied on both surfaces of the bead to seal between two members, the thickness of each coating applied to a portion of the sealing line, where a strong sealing surface pressure is locally generated when the metal gasket is tightened, is made thinner than that of the other portions.

More specifically, when the metal gasket is tightened, the thickness of a portion, where the sealing surface pressure locally becomes high and the sealing line is formed, is made thinner than the other portions. In other words, in a full bead, the thicknesses of a top portion and foot portions are made thinner. In a half bead, the thicknesses of the shoulder portions are made thinner than the those of the other portions.

2) In a metal gasket formed of a plurality of metal base plates, wherein a bead is provided around a hole to be sealed on at least one of the metal base plates and coatings are applied to both surfaces of the bead to seal between two members, the thicknesses of the coatings applied to portions of the sealing lines where the strong sealing surface pressures are locally generated, are made thinner than those of the other portions.

3) In the above metal gaskets, the thin coating portion is formed with the minimum thickness in a range from one tenth to nine tenths of the thickness in the other portions.

The phrase "the thickness of the other portions" is the thickness representing the thickness of the portion, such as an average thickness.

4) In the above metal gaskets, the thickness of the thin coating portion is formed in a range from 10 $\mu$m–40 $\mu$m, and the thickness of the other portions is formed in a range from 20 $\mu$m–100 $\mu$m.

5) Further, in the above gasket, the bead is formed as a full bead, and the thickness of the coating at the recessed portion of the full bead, as the thickness of the other portions of the coating, is made maximum.

6) Also, in the above gaskets, the change of the thickness from the thin portion to the other portion is made continuously. In other words, it is preferable that a step portion is not provided between the thin portion and the thick portion.

7) In the above metal gaskets, as the coating, although a rubber-type coating material, such as NBR rubber, fluororubber and silicone rubber, can be used, it is preferable that the coating is formed of one or a combination of some among an epoxy resin, a phenol resin, a phenoxy resin, a fluoro resin, a polyamide resin and polyamideimide.

The coating is formed of a slightly hard film having a hardness of 2H–6H in the pencil hardness instead of a slightly soft rubber-type elastic film of a hardness of B–5B in the pencil hardness.

8) Also, in the above metal gasket, micro seal coatings are applied on the upper surface of the coatings. In other words, the micro seal coatings made of a material, such as a fluororesin and NBR, are applied to the substantially entire surfaces of the gasket including the upper surface of the coating by a screen printing. The micro seal coating has a hardness of H–2B in the pencil hardness and a thickness of 10 $\mu$m–30 $\mu$m to well fit in the small unevenness, such as a tool mark, formed on the sealing surfaces.

9) The above metal gasket exhibits an excellent effect when it is used as a cylinder head gasket for sealing between the cylinder head and the cylinder block of the engine, wherein especially, the excellent sealing property is required and the flow and torque-down should be prevented.

According to the above structure, the top portion and the foot portions of the bead, where high surface pressures are generated when the metal gasket is tightened, are made thinner than the other portions so as to lower the sealing surface pressures.

Moreover, since the coating does not have any break, the sealing surface pressure does not make any sudden change to thereby improve the sealing property. Especially, when the thickness of the coating is continuously changed from the thin portion to the other portions, the distribution of the sealing surface pressures can be made more smooth.

Since the coatings are provided on both sides of the bead in a belt shape, even if the engine members abutting against the coatings have small unevenness, such as tool marks, the unevenness can be absorbed by the coatings to thereby prevent the combustion gas, cooling water or oil from leaking.

DETAILED DESCRIPTION OF THE PREFERRED EMBODIMENTS

Next, embodiments of a metal gasket according to the present invention will be explained with reference to the accompanying drawings.

Figure 5:
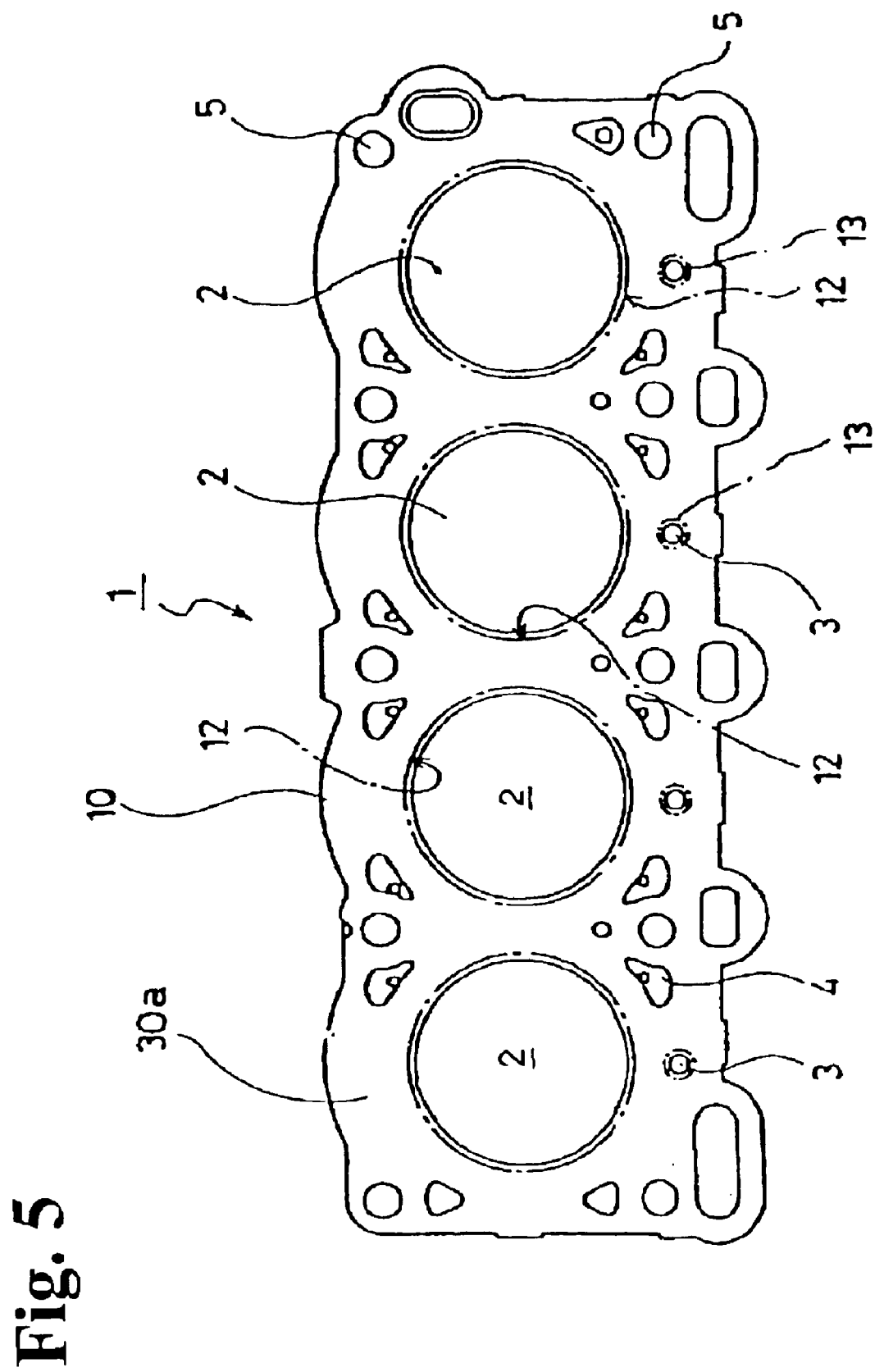
FIG. 5 is a plan view of a cylinder head gasket.

As shown in FIG. 5, the metal gasket (cylinder head gasket) 1 of the first embodiment according to the present invention is installed between a cylinder head and a cylinder block, i.e. cylinder body, (both not shown) of the engine, to seal the combustion gas of high temperature and pressure and the fluid, such as cooling water and cooling oil, passing through a cooling water path and a cooling oil path.

Incidentally, FIGS. 1–4(b) are explanatory schematic views. A plate thickness, a dimension of a sealing groove and a length to width ratio of the cylinder head gasket are different from the actual ones for a demonstration purpose.

Figure 1:
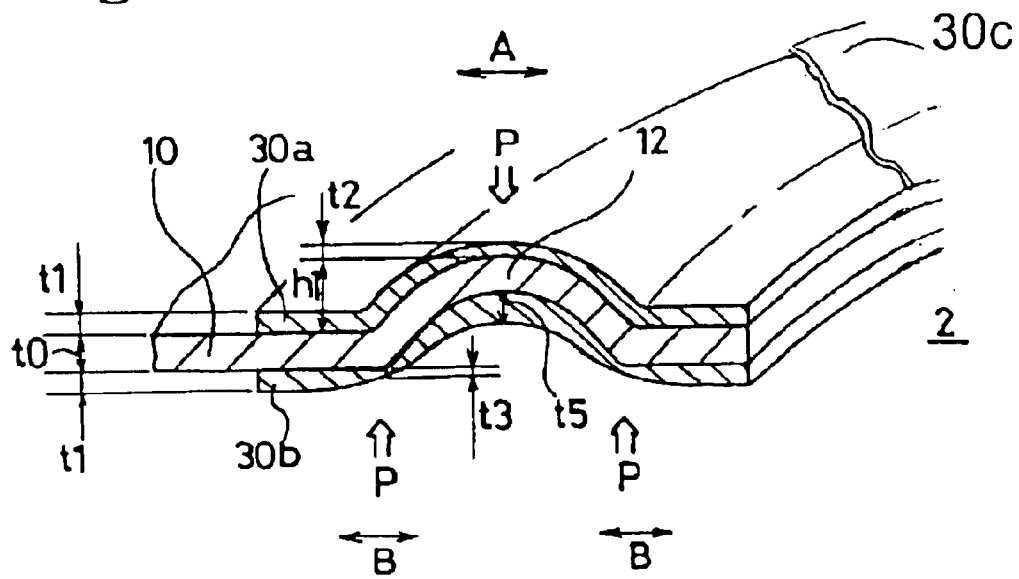
FIG. 1 is a perspective sectional view showing a metal gasket formed of one metal plate and a full bead of the first embodiment according to the present invention.

As shown in FIGS. 1 and 5, the cylinder head gasket 1 of the first embodiment according to the present invention is formed of a metal base plate 10 made of an annealed stainless steel, heat-treated stainless steel (spring steel), soft steel or the like. The metal base plate 10 is formed to have a shape of an engine member, such as a cylinder block, and a plurality of cylinder bores 2, fluid holes 3, 4, bolt holes 5 for tightening bolts and the like are formed therein.

Figure 2:
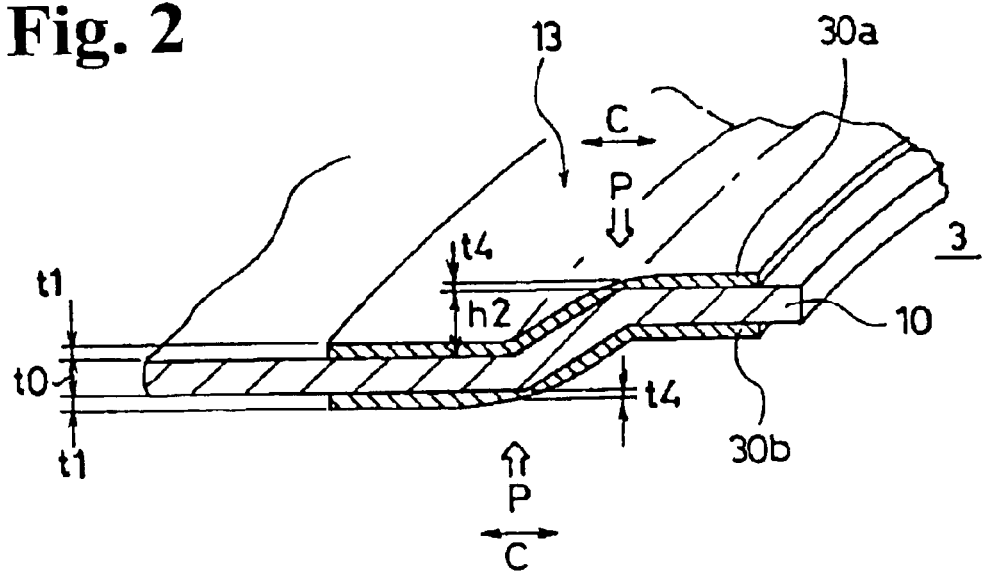
FIG. 2 is a perspective sectional view showing a metal gasket formed of one metal plate and a half bead of the first embodiment.

In the metal plate 10, sealing devices, such as full beads 12 or the like, are provided around the cylinder bores 2 to be sealed, and another sealing devices, such as half beads 13 or the like, are provided around fluid holes 3 to be sealed. As shown in FIGS. 1 and 2, coatings 30a and 30b are applied to both surfaces of the beads 12 and 13, respectively, to cover thereof in a belt shape.

More specifically, the outer sides of the coatings 30a and 30b are extended over the foot portions and the shoulder portions of the beads 12, 13, respectively, for a predetermined width. The inner side, i.e. the side of the cylinder bore 2 to be sealed, of the bead 12 may be extended to the edge of the cylinder bore 2, as shown in FIG. 1. Also, as shown in FIG. 2, the inner side, i.e. the side of the fluid hole 3 to be sealed, of the bead 13 may be extended to the middle of the side of the fluid hole 3, i.e. between the shoulder portion and the edge of the fluid hole 3. Namely, the bead 12 or 13 may be extended to the middle of the inner side of the foot portion or the shoulder portion.

The coatings 30a, 30b are formed of one or a combination of some among an epoxy resin, a phenol resin, a phenoxy resin, a fluororesin, a polyamide resin and polyamide imide. The coatings 30a, 30b are applied to the sealing surfaces along the bead of the metal gasket 1 by the screen printing.

In other words, the coating is formed of a slightly hard thin film having a hardness of 2H–6H in pencil hardness instead of a rubber-type elastic thin film.

In the present invention, as shown in FIG. 1, the thicknesses t2, t3 of the respective coatings 30a, 30b at the top portion A and the foot portions B of the full bead 12 are formed to be thinner than the thicknesses t1, t5 of the other portions. Also, as shown in FIG. 2, the thickness t4 of the shoulder portions C of the half bead 13 is formed to be thinner than the thickness t1 of the other portions.

Further, as shown in FIG. 1, in case the bead 12 is a full bead, the thickness t5 at the concave portion of the full bead 12 is made to be the thickest among the thicknesses t1, t5 in the other portions of the coatings 30a, 30b. Thus, when the full bead 12 is flattened, it can be reinforced from the inside thereof.

The thickness of the coating 30a or 30b is continuously changed from the thin portions A, B to the other portions as shown in FIG. 1, or from the thin portions C to the other portions as shown in FIG. 2, so that no step portion is made between the thin portion A or B and other portion in FIG. 1, or between the thin portion C and other portion in FIG. 2, respectively.

The thicknesses t1 through t5 have such a relationship that the thicknesses t1, t5 of the other portions of the coatings 30a, 30b are formed in a range of 20 $\mu$m to 100 $\mu$m, and the minimum thicknesses t2 and t3, or t4, of the coatings 30a, 30b are formed in a range from 10 $\mu$m to 40 $\mu$m. Or, the thicknesses t2 and t3, or t4 are formed in a range from one tenth to nine tenths of the largest thickness t5.

Regarding the dimensions of the plate, for example, in case the cylinder bore has a diameter of 80 mm, the thickness t0 of the metal base plate 10 is 0.15 to 0.4 mm; the height h1 of the bead 12 for the cylinder bore 2 is 0.05 to 0.3 mm; and the height h2 of the bead 13 for the fluid hole 3 is 0.15 to 0.4 mm.

According to the cylinder head gasket 1 having the structure as described above, when the cylinder head basket 1 is tightened around the full bead 12, or the half bead 13, of the metal base plate 10, a relatively high surface pressure P is generated at the top portion A and foot portions B of the full bead 12, and the shoulder portions C of the half bead 13. However, since the coatings in these portions are formed thinner than the other portions, the sealing surface pressure at these portions can be lowered to thereby prevent the coatings 30a, 30b on these portions A, B, C from flowing and a torque-down resulted therefrom.

Further, since the coatings 30a, 30b are continuously formed, the sealing surface pressures can be smoothly changed to thereby improve the sealing property.

Furthermore, the coatings 30a, 30b are formed on both surfaces of the bead of the metal gasket 1 in a belt shape. Thus, even if a small unevenness, such as a tool mark, is formed on the surface of the engine member, which abuts against the bead, the unevenness is absorbed by the coating 30a or 30b to prevent the combustion gas, cooling water or oil from leaking.

Also, when micro-seal coatings 30c are applied to the substantially entire surfaces of the gasket including the surfaces of the coatings 30a and 30b, a sealing effect can be further increased with respect to the smaller unevenness.

Next, other embodiments according to the present invention will be explained with reference to FIGS. 3(a) through FIG. 4(b).

Figure 3A:
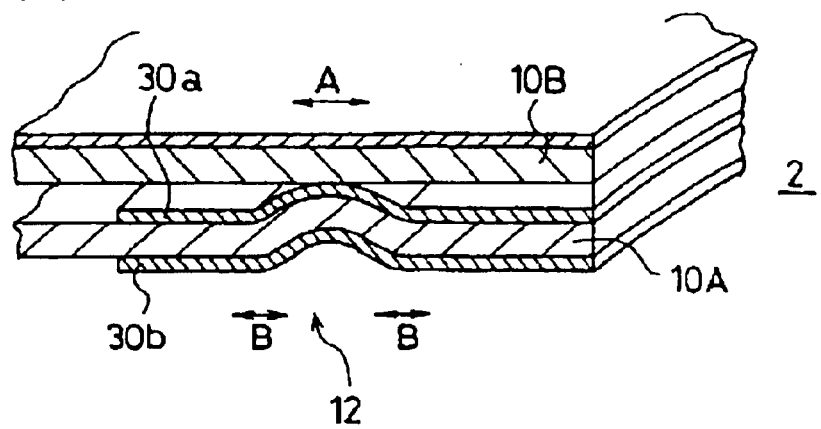
FIG. 3(a) is a perspective sectional view showing a metal gasket formed of two metal plates and a full bead.
Figure 3B:
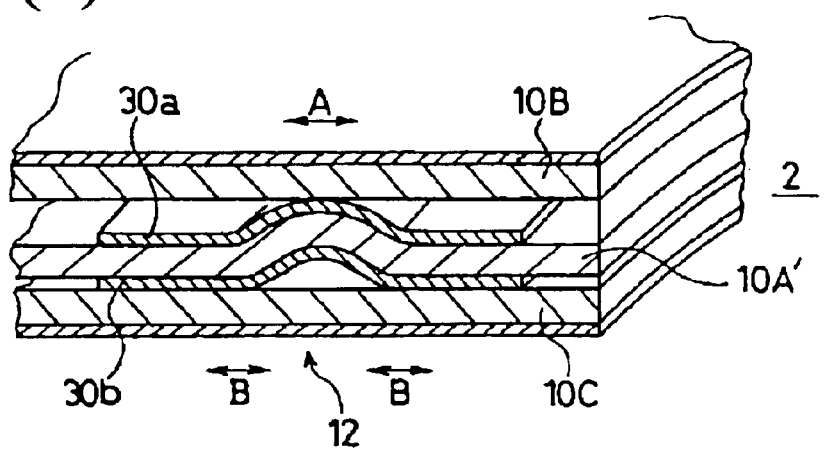
FIG. 3(b) is a perspective sectional view showing a metal gasket formed of three metal plates and a full bead.
Figure 3C:
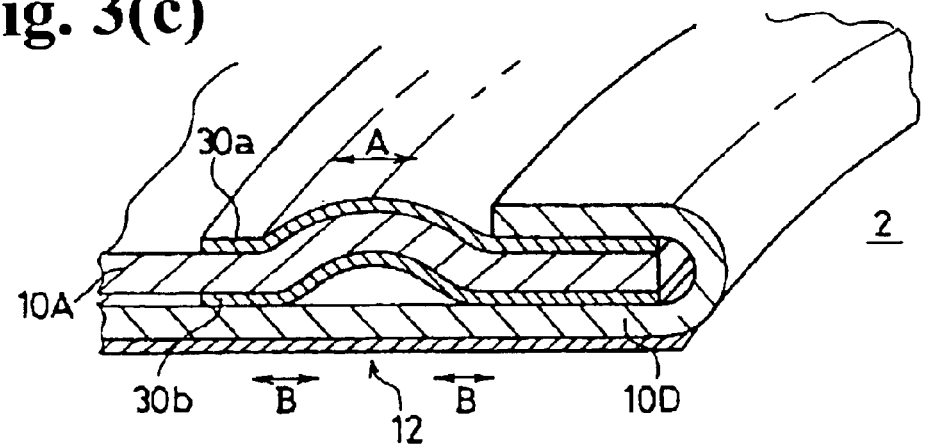
FIG. 3(c) is a perspective sectional view showing a metal gasket formed of two metal palates, a full bead and a grommet.

FIGS. 3(a) to 3(c) show portions of the full beads 12 of metal gaskets formed of a plurality of metal base plates. In these gaskets, the coatings 30a, 30b of the top portions A and foot portions B are made thinner than the other portions, as explained above.

FIG. 3(a) shows a metal gasket having a two plate structure, i.e. plate 10A and plate 10B; FIG. 3(b) shows a metal gasket having a three plate structure, i.e. plate 10A' and plates 10B, 10C; and FIG. 3(c) shows a metal gasket having a two plate structure with a grommet, i.e. plate 10A and a plate 10D with a curved portion and a flange.

Figure 4A:
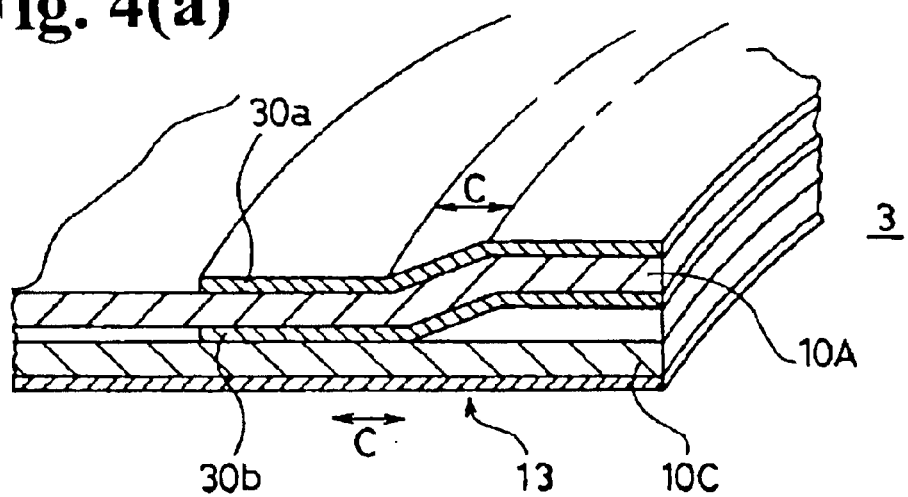
FIG. 4(a) is a perspective sectional view showing a metal gasket formed of two metal plates and a half bead.
Figure 4B:
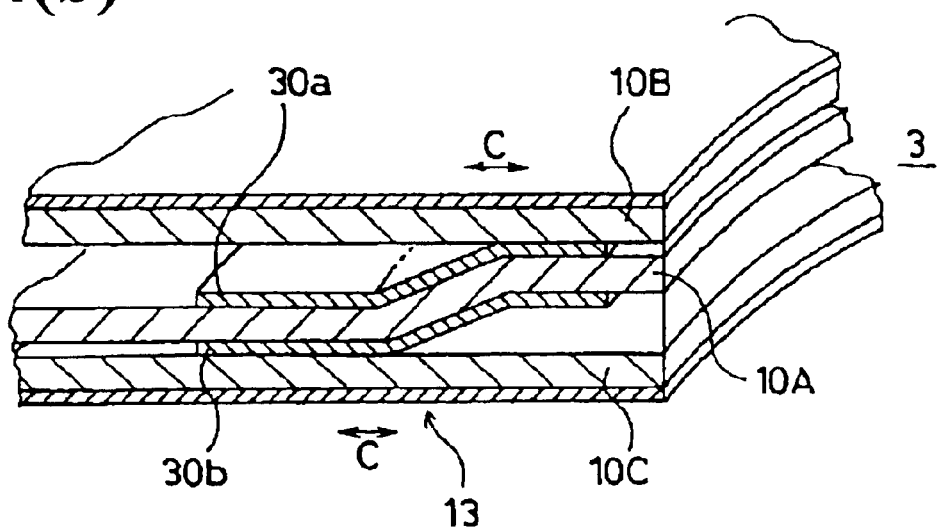
FIG. 4(b) is a perspective sectional view showing a metal gasket formed of three metal plates and a half bead.

FIGS. 4(a) and 4(b) show portions of half beads 13 of metal gaskets formed of a plurality of metal base plates. In the gaskets, the coatings 30a, 30b at the shoulder portions C of the half beads 13 are formed thinner than the other portions, as explained above.

FIG. 4(a) shows a metal gasket having a two plate structure, i.e. plate 10A and plate 10C; and FIG. 4(b) shows a metal gasket having a three plate structure, i.e. plate 10A and plates 10B, 10C.

Incidentally, a micro seal coating is applied on the upper surface of the metal base plate 10B in FIG. 3(a); the micro seal coating is applied on the upper surface of the metal base plate 10B and the lower surface of the metal base plate 10C in FIG. 3(b); and the micro seal coating is applied on the lower surface of the metal base plate 10D in FIG. 3(c).

As described above, according to the metal gasket of the invention, the following effects can be obtained.

When the metal gasket is tightened, sealing lines for locally generating strong sealing surface pressures are formed around the beads, i.e. the top portion and foot portions of the full bead or the shoulder portion of the half bead, of the metal base plate of the metal gasket. In the present invention, since the sealing line portions are formed to be thinner than the other portions, the sealing surface pressures at these portions can be lowered.

The lowering of the sealing surface pressures prevents the coatings from flowing and wearing at the top portion and the foot portions of the full bead, and the shoulder portions of the half bead, which leads to the suppression of the torque-down.

Also, since the coating is continuously formed, the sealing surface pressures can be smoothly changed to improve the sealing property.

Further, the coating is formed in a belt shape to cover the bead of the metal gasket. Therefore, even if there is a small unevenness, such as a tool mark, on the surface of the engine member against which the coating abuts, the unevenness can be absorbed by the coating to thereby prevent the combustion gas, cooling water or oil from leaking.

Furthermore, when the micro seal coatings are applied to the substantially entire surfaces of the metal gasket including the upper surface of the coating, the sealing effect for the smaller unevenness can be increased.

Thus, the metal gasket having good sealing property and durability can be obtained.

While the invention has been explained with reference to the specific embodiments of the invention, the explanation is illustrative and the invention is limited only by the appended claims.

What is claimed is:

1. A metal gasket for sealing two members, comprising:

a first metal plate having a flat portion, a hole to be sealed, a half bead formed around the hole, said half bead having a top shoulder portion facing upwardly and a bottom shoulder portion facing downwardly, said top and bottom shoulder portions forming first surface pressure forming portions, and other portions on and around the half bead forming a second surface pressure forming portion providing a surface pressure less than surface pressures formed at the first surface pressure forming portions when the first metal plate is tightened, and seal coatings formed on two sides of the first metal plate on and around the half bead and having thin coating portions deposited on the top and bottom shoulder portions as the first surface pressure forming portions, said thin coating portion having a thickness less than an average thickness of the seal coating except for the thin coating portions to thereby reduce the surface pressures at the first surface pressure forming portions when the gasket is tightened so that further reduction of the surface pressures at the first surface pressure forming portions for a long time is prevented, wherein said seal coatings formed on and around the half bead on the two sides of the first metal plate including portions opposite to the top and bottom shoulder portions have the thicknesses substantially equal except for the top and bottom shoulder portions.

* * * * *